US011615511B2

(12) United States Patent
Lin et al.

(10) Patent No.: US 11,615,511 B2
(45) Date of Patent: Mar. 28, 2023

(54) COMPUTING DEVICE AND METHOD OF REMOVING RAINDROPS FROM VIDEO IMAGES

(71) Applicant: Quanta Computer Inc., Taoyuan (TW)

(72) Inventors: Chien-Hung Lin, Taoyuan (TW); Yang-Sheng Wang, Taoyuan (TW); Yu-Ching Chen, Taoyuan (TW); Chih-Tsang Yeh, Taoyuan (TW); Po-An Yang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 276 days.

(21) Appl. No.: 17/107,586

(22) Filed: Nov. 30, 2020

(65) Prior Publication Data
US 2022/0058778 A1 Feb. 24, 2022

(30) Foreign Application Priority Data
Aug. 18, 2020 (TW) ................................. 109128001

(51) Int. Cl.
*G06T 5/00* (2006.01)
*G06K 9/62* (2022.01)
(Continued)

(52) U.S. Cl.
CPC ............ *G06T 5/005* (2013.01); *G06K 9/6256* (2013.01); *G06T 5/50* (2013.01); *G06T 7/60* (2013.01);
(Continued)

(58) Field of Classification Search
CPC .. G06T 5/005; G06T 5/50; G06T 7/60; G06T 7/70; G06T 2207/10016;
(Continued)

(56) References Cited

U.S. PATENT DOCUMENTS

2019/0019042 A1\* 1/2019 Tanigawa ................ G06V 20/56
2020/0134837 A1\* 4/2020 Varadarajan ............ G06T 7/215
(Continued)

FOREIGN PATENT DOCUMENTS

CN 105139344 A 12/2015

OTHER PUBLICATIONS

Chinese Language Office Action dated Aug. 26, 2021 for its corresponding TW application No. 109128001.
(Continued)

*Primary Examiner* — Amara Abdi
(74) *Attorney, Agent, or Firm* — McClure, Qualey & Rodack, LLP

(57) ABSTRACT

A method of removing raindrops from video images is provided. The method includes the steps of: training a raindrop image recognition model using a plurality raindrop training images labeled in a plurality of rainy-scene images; recognizing a plurality of raindrop images from a plurality of scene images in a video sequence using the raindrop image recognition model; and in response to a specific raindrop image in a current scene image satisfying a predetermined condition, replacing the specific raindrop image in the current scene image with an image region corresponding to the specific raindrop image in a specific scene image prior to the current scene image to generate an output scene image.

5 Claims, 8 Drawing Sheets
(3 of 8 Drawing Sheet(s) Filed in Color)

(51) Int. Cl.
 *G06T 7/70* (2017.01)
 *G06T 7/60* (2017.01)
 *G06T 5/50* (2006.01)
 *G06V 10/22* (2022.01)
 *G06V 20/40* (2022.01)
 *G06V 20/56* (2022.01)

(52) U.S. Cl.
 CPC ............... *G06T 7/70* (2017.01); *G06V 10/22* (2022.01); *G06V 20/40* (2022.01); *G06V 20/56* (2022.01); *G06T 2207/10016* (2013.01); *G06T 2207/30192* (2013.01); *G06T 2207/30252* (2013.01)

(58) Field of Classification Search
 CPC . G06T 2207/30192; G06T 2207/30252; G06T 2207/20081; G06T 2207/20182; G06T 2207/20221; G06K 9/6256; G06V 10/22; G06V 20/40; G06V 20/56; G06V 10/774; G06V 10/454; G06V 10/82; G06V 20/58
 See application file for complete search history.

(56) References Cited

U.S. PATENT DOCUMENTS

| | | | |
|---|---|---|---|
| 2020/0151466 A1* | 5/2020 | Kokubo | G06V 20/588 |
| 2021/0101564 A1* | 4/2021 | Banno | B60S 1/0844 |
| 2021/0247201 A1* | 8/2021 | Hori | G01C 21/3602 |

OTHER PUBLICATIONS

Search Report dated Aug. 26, 2021 for its corresponding TW application No. 109128001.

* cited by examiner

COMPUTING DEVICE AND METHOD OF REMOVING RAINDROPS FROM VIDEO IMAGES

CROSS REFERENCE TO RELATED APPLICATIONS

This application claims priority of Taiwan Patent Application No. 109128001, filed on Aug. 18, 2020, the entirety of which is incorporated by reference herein.

BACKGROUND OF THE DISCLOSURE

Field of the Disclosure

The present disclosure relates to object recognition, and, in particular, to a computing device and a method of removing raindrops from video images.

Description of the Related Art

The technology behind autonomous vehicle driving is advancing. Autonomous vehicle driving software often needs to judge road conditions based on the video images obtained by a camera built into the vehicle. However, when the weather is bad, the video image captured by the vehicle camera can be susceptible to raindrops, which can reduce the accuracy of the rear-end vehicle recognition and road condition recognition, which will affect the decision-making in autonomous vehicle driving.

BRIEF SUMMARY OF THE DISCLOSURE

In view of the above, a computation apparatus and a method of removing raindrops from video images are provided to solve the aforementioned problem.

In an exemplary embodiment, a method of removing raindrops from video images is provided. The method includes the following steps: training a raindrop-image-recognition model using a plurality of raindrop training images labeled in a plurality of rainy scene images; recognizing a plurality of raindrop images in a plurality of scene images of a video sequence using the raindrop-image-recognition model; and in response to a specific raindrop image in a current scene image among the scene images satisfying a predetermined condition, replacing the specific raindrop image in the current scene image with an image region corresponding to the specific raindrop image in a specific scene image prior to the current scene image to generate an output scene image.

In another exemplary embodiment, a computation apparatus is provided. The computation apparatus includes a non-volatile memory and a processor. The non-volatile memory stores a raindrop-removal program. The processor is configured to execute the raindrop-removal program to perform the following steps: training a raindrop-image-recognition model using a plurality of raindrop training images labeled in a plurality of rainy scene images; recognizing a plurality of raindrop images in a plurality of scene images of a video sequence using the raindrop-image-recognition model; and in response to a specific raindrop image in a current scene image among the scene images satisfying a predetermined condition, replacing the specific raindrop image in the current scene image with an image region corresponding to the specific raindrop image in a specific scene image prior to the current scene image to generate an output scene image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
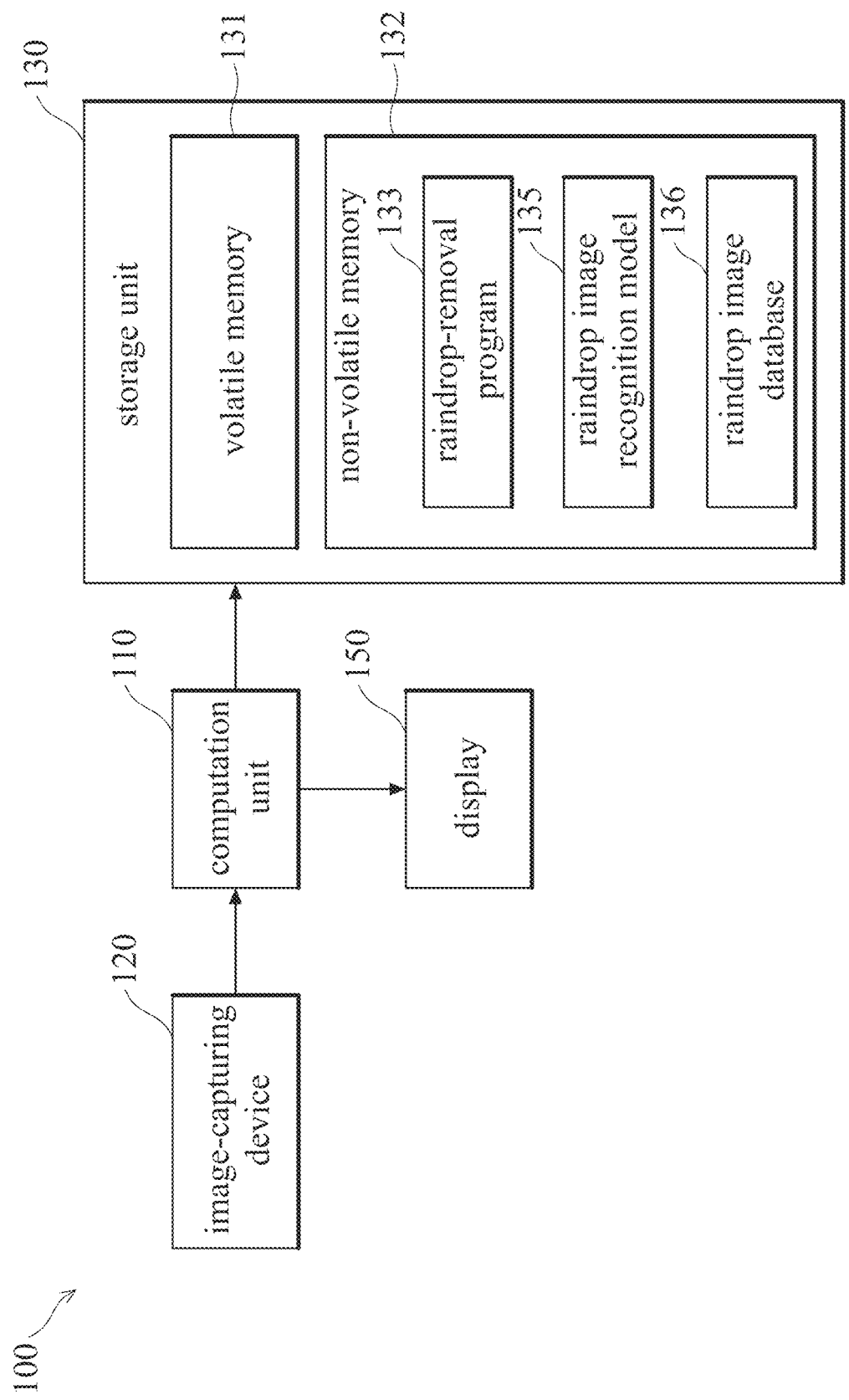
FIG. 1 is a block diagram of a computation apparatus in accordance with an embodiment of the invention.

FIG. 1 is a block diagram of a computation apparatus in accordance with an embodiment of the invention.

In an embodiment, the computation apparatus 100 may be implemented by, for example, a personal computer, a vehicle computer, a server, or a portable device, and can be installed on a vehicle. The computing apparatus 100 includes a computation unit 110, an image-capturing device 120, a storage unit 130, and a display unit 150. The computation unit 110 can be implemented in a variety of ways, such as dedicated hardware circuits or general-purpose hardware (e.g., a single processor, multi-processors with parallel processing capabilities, graphics processors or other processors with computing capabilities), and when executing the code or software related to the various models or processes of the present invention, the functions described later are provided. The image-capturing device 120 may be a camera, and the image-capturing device 120 is used to capture a scene image in a predetermined field of view (FOV) in front of the vehicle, such as a window of the vehicle. In some embodiments, the computation apparatus 100 may include a plurality of image-capturing devices 120, and each image-capturing device 120 can be disposed at different predetermined positions on the vehicle to capture scene images of different predetermined FOVs around the vehicle.

The storage unit 130 may include a volatile memory 131 and a non-volatile memory 132. The non-volatile memory 132 is configured to store a raindrop-image database 136, and data and various codes required in the object-recognition process, such as the raindrop-removal program 133, the raindrop-image-identification model 135 and so on. The non-volatile memory 132 may be, for example, a hard disk drive, a solid-state disk, a flash memory, or a read-only memory (ROM), but the invention is not limited thereto. The volatile memory 132 may be a random-access memory, such as a static random access memory (SRAM) or a dynamic random access memory (DRAM), but the invention is not limited thereto. The volatile memory 131 may be used to temporarily store the intermediate data and images in the object-recognition process.

In an embodiment, the non-volatile memory 132 may store a raindrop-removal program 133, and the computation unit 110 may load the raindrop-removal program 133 from the non-volatile memory 132 to the volatile memory 131 for execution.

The display unit 150 may be a display panel (e., a thin-film liquid-crystal display panel, an organic light-emitting diode (OLED) panel, or other panels having display capabilities), that is used to display a user interface provided by the application executed by the computation unit 110. In some embodiments, the display unit 150 may be integrated with a touch device to form a touch panel, and the user can perform touch operations on the user interface display by the display unit 150.

In an embodiment, the non-volatile memory 132 further includes a raindrop-image database 136 and a raindrop-image-recognition model 135. For example, the raindrop-image database 136 stores the labeled raindrop images among the plurality of rainy scene images. Each rainy scene image can be, for example, a rainy street view obtained in advance or taken in real time by the image-capturing device 120. It may or may not include vehicles on the street, which means that each rainy scene image contains multiple raindrop images, and the user can label (e.g., frame selection) the position and size of each raindrop image in each rainy scene image through the user interface of the raindrop-removal program 133.

Figure 2:
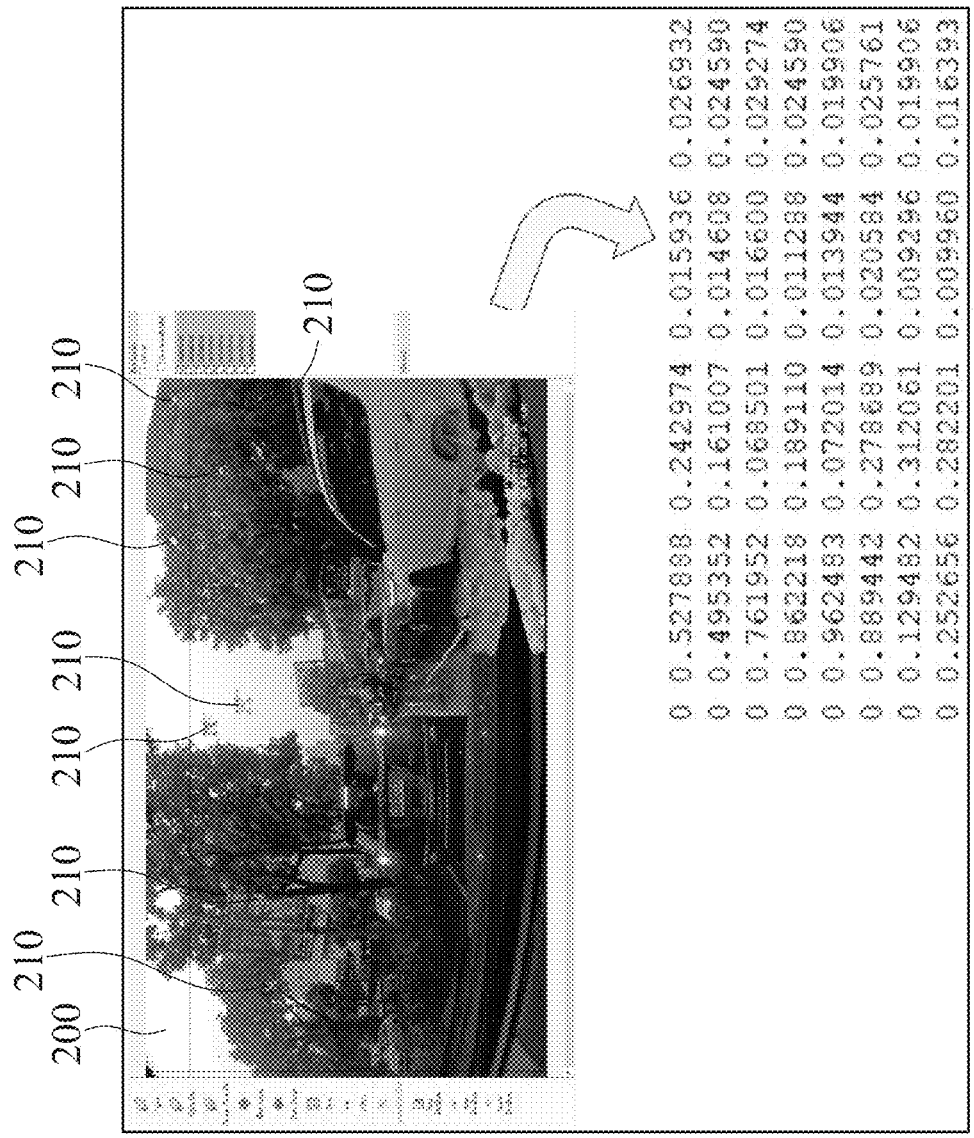
FIG. 2 is a diagram of labeling raindrop training images in a rainy scene image in accordance with an embodiment of the invention.

FIG. 2 is a diagram of labeling raindrop training images in a rainy scene image in accordance with an embodiment of the invention.

As depicted in FIG. 2, the rainy scene image 200 may be pre-stored in the raindrop-image database 136. For example, the coordinates of pixels in the rainy scene image 200 are based on the upper-left corner as the original, and the X-axis is positive to the right, and the Y-axis is positive to the bottom. The coordinates of the upper-left corner, upper-right corner, lower-left corner, and lower-right corner of the rainy scene image 200 are (0, 0), (1, 0), (0, 1), and (1, 1), respectively. The user can first label the position and size of each raindrop training image 210 in the rainy scene image 200 on the user interface of the raindrop-removal program 133, and the raindrop-removal program 133 can convert the labeled position and size to a horizontal ratio and a vertical ratio of each raindrop training image 210 in the rainy scene image 200, where the horizontal ratio and the vertical ratio are values between 0 and 1.

After the labeling process is completed, the raindrop-removal program 133 can covert the position and size of each raindrop training image 210 in the rainy scene image 200 into a text file, as shown in the lower portion of FIG. 2. In addition, the raindrop-removal program 133 can further crop each raindrop training image 210 labeled in the rainy scene image 200 to obtain a separate raindrop training image 210, and store each raindrop training image 210 and its position and size information (e.g., may be a separate text file) in the raindrop-image database 136.

Figure 3:
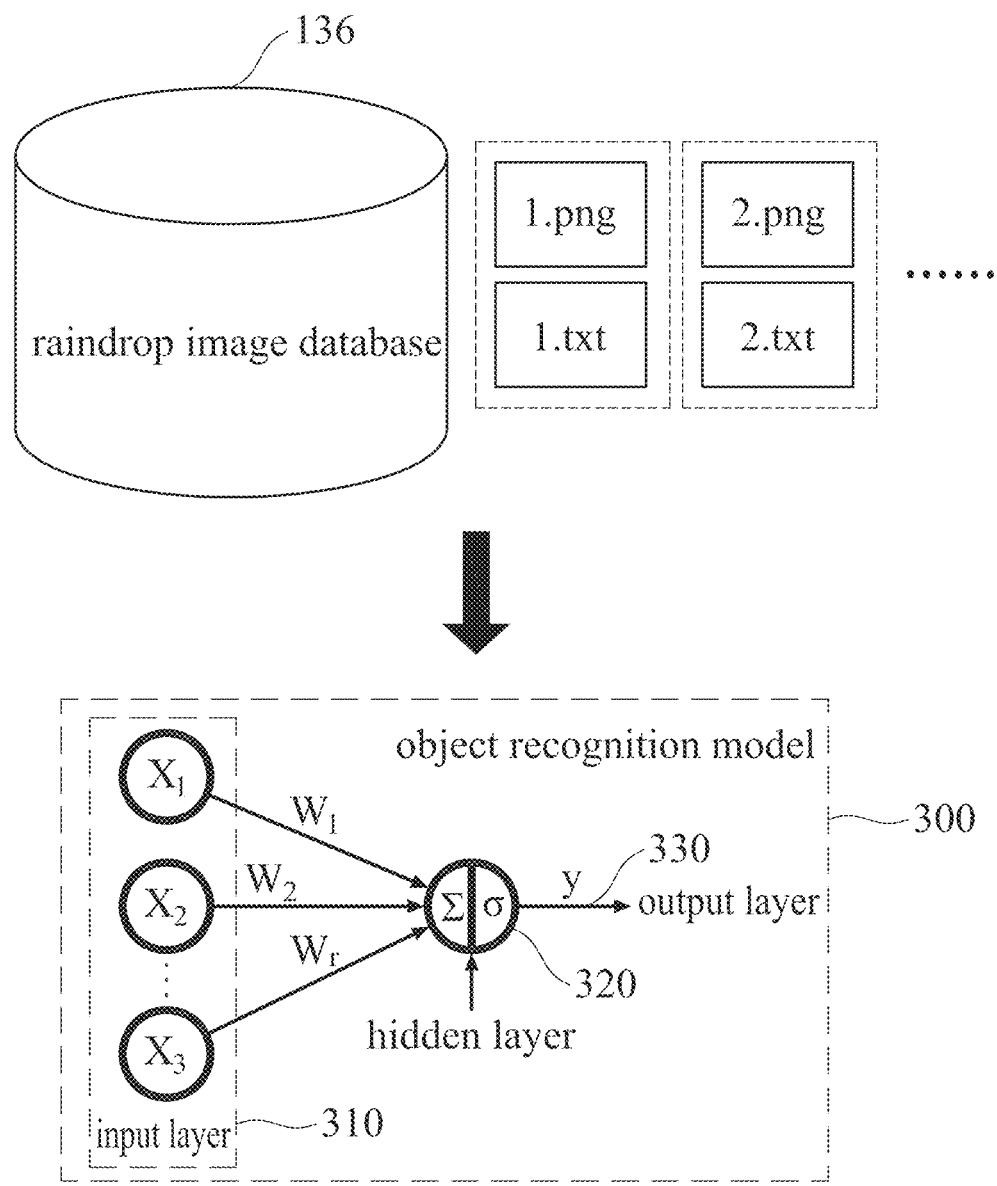
FIG. 3 is a diagram of training the object-recognition model in accordance with an embodiment of the invention.

FIG. 3 is a diagram of training the object-recognition model in accordance with an embodiment of the invention. Afterwards, the user may input each raindrop training image 210 and its position and size information stored in the raindrop-image database 136 into an object-recognition model 300 for deep learning. For example, the raindrop training image 1.png and its position/size information 1.txt is the first data, and the raindrop training image 2.png and its position/size information 2.txt is the second data, and so on. The object-recognition model 300 may be a convolutional neural network (CNN) or a deep neural network (DNN), but the invention is not limited thereto. One having ordinary skill in the art can also use other conventional object-recognition techniques.

For example, as depicted in FIG. 3, each raindrop training image 210 (e.g., png file) and its position/size information (e.g., text file) are input into bias neurons x1 to xr of the input layer 310 of the object-recognition model 300, and each of the bias neuron x1 to xr has a corresponding weight W1 to Wr. After the data of the input layer 310 is processed by bias operations and activation function performed by the hidden layer 320 or a fully connected layer of the object-recognition model 300, a recognition result can be obtained in the output layer 330.

When a sufficient amount of training data is input, the object-recognition model 300 has been trained to recognize raindrop images, so the object-recognition model 300 can be regarded as the raindrop-image-recognition model 135 at this time, and can be used to recognize the raindrop images of each scene image in the video sequence that is input to the object-recognition model 300.

Figure 4A:
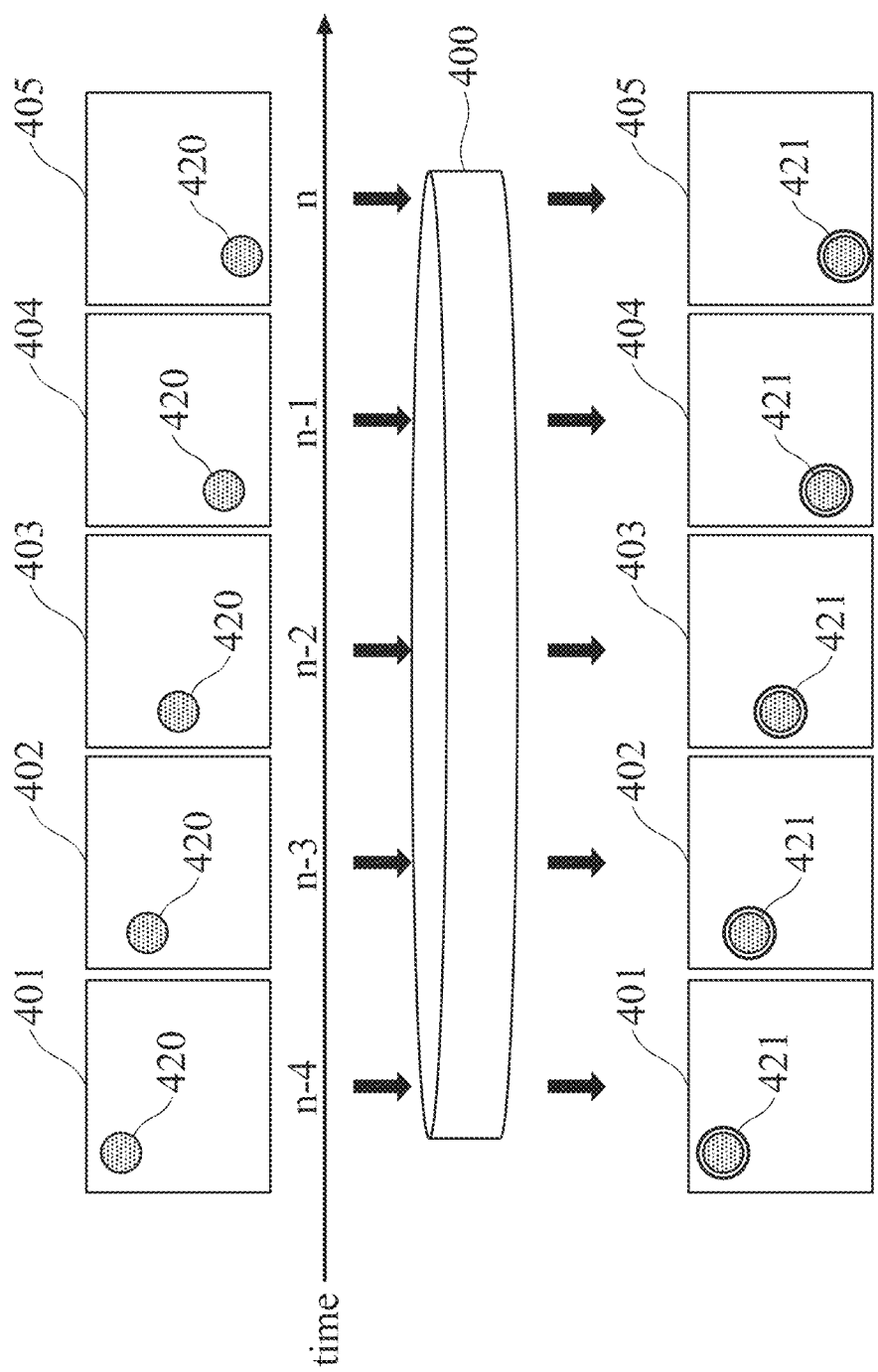
FIG. 4A is a diagram of recognizing raindrops of the input scene image using the raindrop-image-recognition model in accordance with an embodiment of the invention.
Figure 4B:
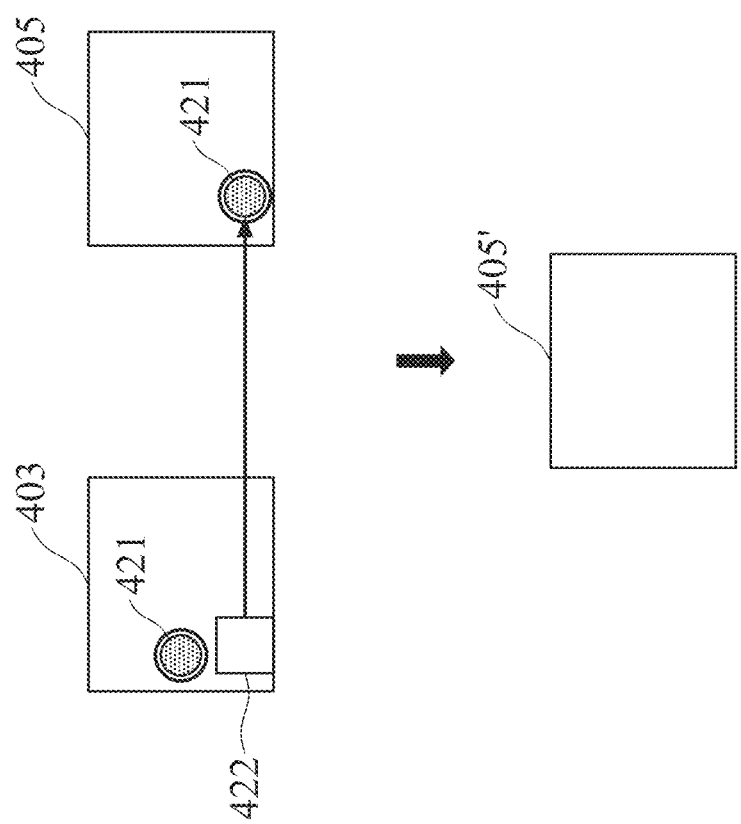
FIG. 4B is a diagram of the raindrop-removal process in accordance with an embodiment of the invention.

FIG. 4A is a diagram of recognizing raindrops of the input scene image using the raindrop-image-recognition model in accordance with an embodiment of the invention. FIG. 4B is a diagram of the raindrop-removal process in accordance with an embodiment of the invention.

As depicted in FIG. 4A, it is assumed that the image-capturing device 120 can shoot 5 scene images per second, such as scene image 401 to 405 and subsequent scene images (not shown in FIG. 4A). For ease of description, one raindrop image 420 is shown in the scene images 401 to 405, and the raindrop image 420 will move down over time in the scene images 401 to 405. However, each of actual scene image 401 to 405 may include a plurality of raindrop images. The scene images 401 to 450 are input to the raindrop-image-recognition model 400 as "current scene image" according to the shooting sequence, and the raindrop-image-recognition model 400 can sequentially recognize the raindrop images 421 in the scene images 401 to 405. The so-called current scene image represents the image that is being recognized. For example, if the scene image 403 is currently being recognized, the scene image 403 is the current scene image, and the previously recognized scene images 401 and 402 are called as "previous scene images".

After the raindrop-image-recognition model 400 has recognized all raindrop images in the current scene image, the number and position of each (recognized) raindrop image 421 in the current scene image can be known, and that can be removed (or replaced) according to a predetermined order or randomly as described below. It should be noted that the position and size of the original raindrop image 420 in each scene image are close to the position and size of the recognized raindrop image 421.

In some embodiments, the raindrop-image-recognition model 400 may set a stop condition to stop recognizing and replacing the raindrop images 421 in each scene image. The aforementioned stop condition can be, for example: (1) the raindrop-image-recognition model 400 has recognized a predetermined amount of raindrop images 421 from the current scene image; or (2) the raindrop-image-recognition model 400 has recognized all raindrop images 421 (e.g., a first number N), and has successfully removed a predetermined ratio for the first number N of raindrop images 421, for example, half (i.e., N/2) of raindrop images 421 have been successfully removed.

If the scene image 405 is the current scene image, when the raindrop-image-recognition model 400 has recognized the raindrop image 421 from the scene image 405, the position and size of the raindrop image 421 will be recorded, such as the position and size information shown in the lower portion in FIG. 2. The raindrop-removal program 133 may then determine whether the raindrop image 421 can be replaced by a corresponding region in the previous scene images (e.g., scene images 401 to 404).

Specifically, the raindrop-removal program 133 may calculate the degree of overlapping between the raindrop image in the current scene image and the raindrop image 421 in any of previous scene images (e.g., scene images 401 to 404), wherein the degree of overlapping can be represented by "intersection over union (IoU)" which is a ratio of the overlapping area to the union area. For example, for ease of description, it is assumed that the size of the raindrop images 421 in the current scene image and previous scene image is A, and the overlapping area of the two raindrop images 421 occupies ⅔ of the area of the raindrop image 421, which means that the union area is 4/3 of the area of the raindrop image 421. At this time, the IoU of the raindrop images 421 in the current scene image and previous scene image can be calculated as $$IoU = \frac{\frac{2A}{3}}{\frac{4A}{3}} = 0.5.$$

It should be noted that even if it is the same raindrop image, the size of the raindrop image in the scene images at different time points may be different because the vehicle camera is shooting while the vehicle is moving. However, by using the aforementioned method, the raindrop-removal program 133 can still calculate the IoU of the raindrop images in the current scene image and previous scene image.

In the embodiment, the raindrop-removal program 133 can further set a predetermined ratio threshold (e.g., 0.5), and determine whether the combined ratio of the raindrop image 421 is less than the predetermined ratio threshold.

When the IoU is less than the predetermined ratio threshold, it indicates that the degree of overlapping of the raindrop images 421 in the current scene image and previous scene image is small, so the raindrop-removal program 133 can determine that the raindrop image 421 is revertible (i.e. the raindrop image 421 in the current scene image can be removed via replacing), and put the raindrop image 421 in the current scene image to the revertible candidate list. In other words, the raindrop-removal program 133 can replace the portion of the raindrop image 421 in the current scene image, that is not overlapped with the raindrop image 421 in the previous scene image, with the corresponding region (i.e., non-overlapping region) in the previous scene image. Accordingly, all or a portion of the raindrop image in the current scene image can be replaced by pixels in the corresponding region in the previous scene image.

In some embodiments, the raindrop-removal program 133 may first calculate the IoU between the raindrop image in the current scene image (e.g., scene image 405, t=n) and the raindrop image 421 in the previous scene image (e.g., scene image 404, t=n−1). If the raindrop-removal program 133 determines that the IoU is smaller than the predetermined ratio threshold, the raindrop-removal program 133 may put the raindrop image in the current scene image into the revertible candidate list, and record the information in the corresponding previous scene image 404. If the raindrop-removal program 133 determines that the IoU is greater than or equal to the predetermined ratio threshold, the raindrop-removal program 133 will calculate the IoU between the raindrop image in the current scene image (e.g., scene image 405, t=n) and the raindrop image 421 in the previous scene image (e.g., scene image 403, t=n−1). Similarly, if the raindrop-removal program 133 determines that the IoU is smaller than the predetermined ratio threshold, the raindrop-removal program 133 may put the raindrop image in the current scene image into the revertible candidate list, and record the information in the corresponding previous scene image 403. If the raindrop-removal program 133 determines that the IoU is greater than or equal to the predetermined ratio threshold, the raindrop-removal program 133 will calculate the IoU between the raindrop image in the current scene image (e.g., scene image 405, t=n) and the raindrop image 421 in the previous scene image (e.g., scene image 402, t=n−2).

The aforementioned process of determining whether the raindrop image in the current scene image can be put into the revertible candidate list can be repeated, and the raindrop-removal program 133 can compare with a predetermined number (e.g., 4) of previous scene images at most, but the invention is not limited thereto. Accordingly, the raindrop-removal program 133 may determine the trajectory of the raindrop image 421 according to the IoU between the raindrop image 421 in the current scene image and the raindrop image 421 in each previous scene image.

In other words, if the IoU between the raindrop image 421 in the current scene image (e.g., scene image 405) and the raindrop image 421 in any of the previous scene images is greater than or equal to the predetermined ratio threshold, the raindrop-removal program 133 will not put the raindrop image 421 in the current scene image to the revertible candidate list.

In some embodiments, if the IOUs between the raindrop image 421 in the current scene image (e.g., scene image 405) and the raindrop images 421 in multiple previous scene images are smaller than the predetermined ratio threshold, the raindrop-removal image will select the previous scene image at a time point closer to the current scene image as the previous scene image corresponding to the raindrop image 421 in the revertible candidate list.

In some other embodiments, when multiple IOUs between the raindrop image 421 in the current scene image (e.g., scene image 405) and the raindrop images 421 in multiple previous scene images are smaller than the predetermined ratio threshold, the raindrop-removal program 133 will compare the IOUs and select the previous scene image having the smallest IoU (i.e., least overlapping) as the previous scene image corresponding to the raindrop image in the revertible candidate list.

Specifically, when the raindrop image 421 in the current scene image is recognized by the raindrop-image-recognition model 400 and the raindrop-removal program 133 places the raindrop image 421 into the revertible candidate list, it indicates that the raindrop-removal program 133 may perform the raindrop-removal process on the raindrop image 421. As depicted in FIG. 4B, the raindrop image 421 in the current scene image (e.g., scene image 405) does not overlap the raindrop image 421 in the previous scene image (e.g., scene image 403), and thus the corresponding IoU is 0. It indicates that the raindrop image 421 in the current scene image (e.g., scene image 405) can be totally replaced by pixels in the image region 422 in the previous scene image (e.g., scene image 403) to obtain an output scene image 405'. It should be noted that, in order to facilitate calculation, the raindrop images recognized by the raindrop-image-recognition model 400 are generally represented by rectangular images, and the corresponding image region of the raindrop image in the previous scene image corresponds to the shape of the raindrop image. Using the scene images shot at different time points in the video sequence, the corresponding image region in the previous scene image that is more suitable to replace the raindrop in the current scene image can be found. Therefore, the method of removing raindrops from video images in the invention can achieve a better effect of raindrop removal.

Figure 5A:
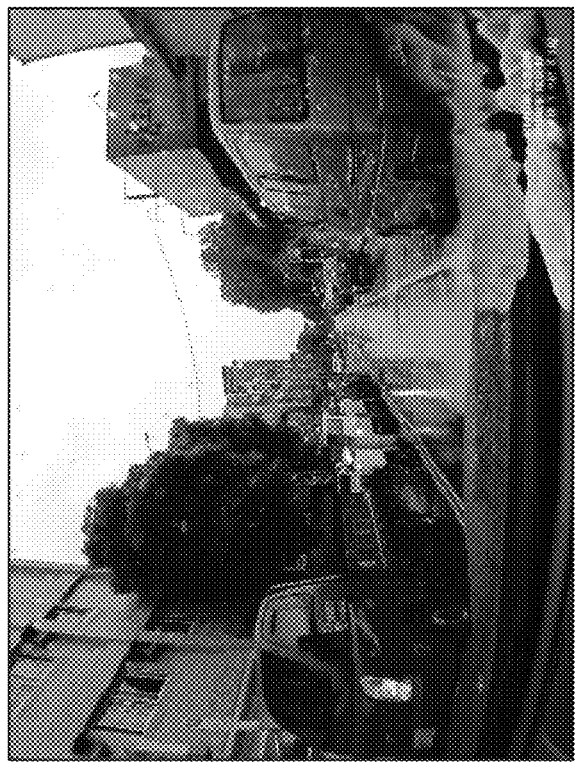
FIGS. 5A and 5C are diagrams of the current scene image in accordance with an embodiment of the invention.
Figure 5B:
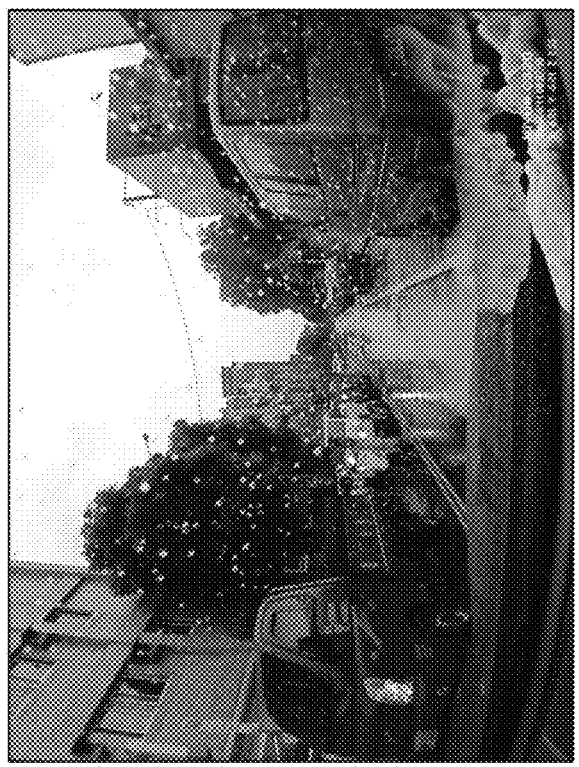
FIGS. 5B and 5D are diagrams of the output scene image in accordance with an embodiment of the invention.
Figure 5D:
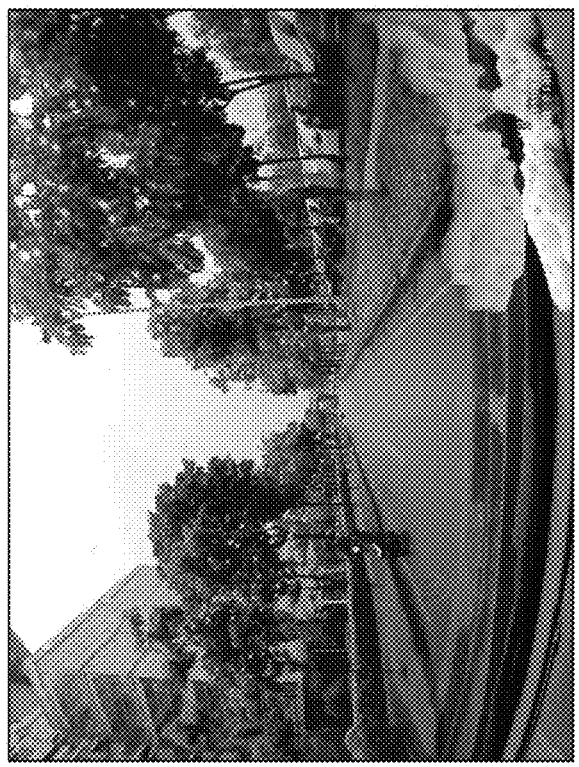
Figure 5C:
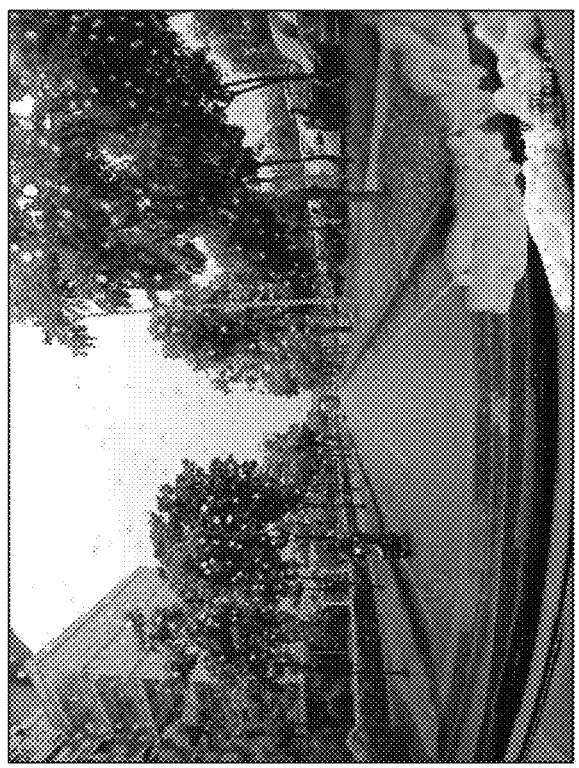

As shown in FIG. 5A and FIG. 5C, there are many raindrop images in the scene images 510 and 530 captured by the image-capturing device 120, and output scene images 511 and 531 as respectively shown in FIG. 5B and FIG. 5D can be obtained after the raindrop-image-recognition model has recognized the raindrop images and performed the raindrop-removal process.

In some embodiments, the raindrop-removal program 133 can set a region of interest (ROI) or a priority region, such as setting a predetermined region around the center of the scene image as the ROI. If the height and width of the scene image are respectively H and W, the ROI can be, for example, the center of the scene image extending up and down by H/4 and left and right by W/4. This ROI is also the most concentrated region of the driver's attention, so it is necessary to remove raindrops in the scene image first to improve the accuracy and reliability of the back-end image processing and autonomous vehicle driving decisions.

When the number of raindrop images in the revertible candidate list corresponding to the current scene image is quite large, if the computation unit 110 has considerations of computing performance or power consumption, it is not necessary for the computation unit 110 to perform the raindrop-removal processing on all raindrop images in the current scene image. Accordingly, the raindrop-removal program 133 can preferentially perform the raindrop-removal processing on the raindrop images in the revertible candidate list and located in the ROI. If the number of raindrop images in the revertible candidate list and located in the ROI is still quite large, the raindrop-removal program 133 can select the raindrop images in the revertible candidate list in a predetermined order (e.g., sequential scanning) or randomly in the ROI, and perform the raindrop-removal processing on the selected raindrop images.

Similar to the aforementioned embodiment, in this embodiment, the raindrop-image-recognition model 400 can also set a stop condition to stop recognizing and replacing the raindrop images 421 in the current scene image, where the stop condition may be, for example: (1) the raindrop-image-recognition model 400 has recognized a predetermined number of raindrop images 421 in the ROI of the current scene image; (2) the raindrop-image-recognition model 400 has recognized all raindrop images in the ROI of the current scene image (e.g., the first number N), and the raindrop images 421 of a predetermined portion (e.g., 0.5) of the first number N have been successfully removed, that is, there are N/2 number of raindrop images 421 in the ROI that have been successfully removed.

In one embodiment, the non-volatile memory 132 in FIG. 1 can only store the raindrop-image-recognition model 135. The raindrop-image database 136 and the raindrop-removal program 133 can be stored and executed by other computing apparatuses, and then the generated raindrop-image-recognition model 135 is stored in the computing apparatus 100 to perform the aforementioned operations, which can reduce the resources required by the computing apparatus 100.

Figure 6:
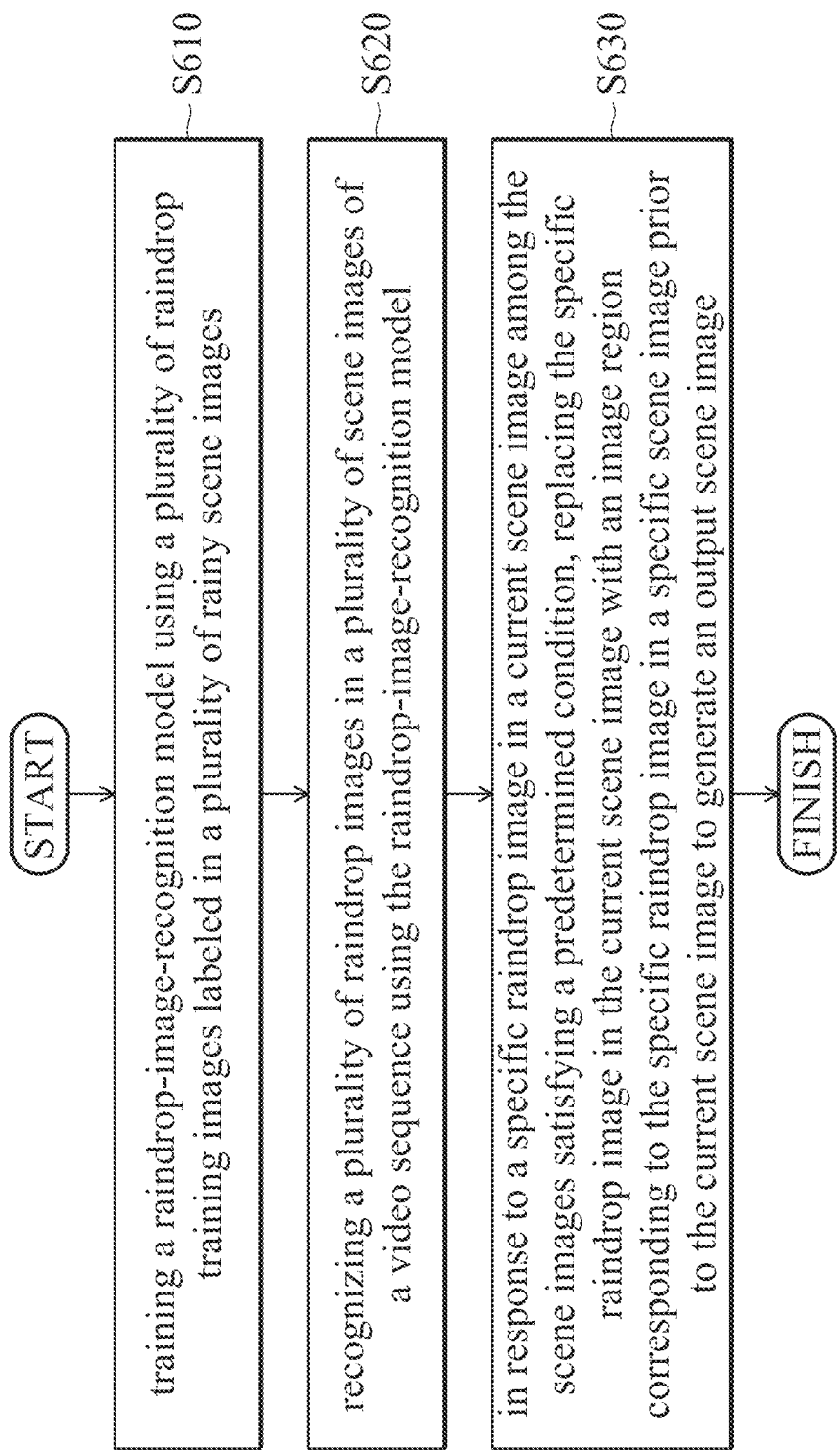
FIG. 6 is a flow chart of a method of removing raindrops from video images in accordance with an embodiment of the invention.

FIG. 6 is a flow chart of a method of removing raindrops from video images in accordance with an embodiment of the invention.

Referring to FIG. 1 and FIG. 6, in step S610, a raindrop-image-recognition model is trained using a plurality of labeled first raindrop images among in a plurality of rainy scene images. For example, the user may label the position and size of each raindrop image 210 in the rainy scene image 200 on the user interface of the raindrop-removal program 133, the raindrop-removal program 133 can convert the labeled position and size of each raindrop training image to a horizontal ratio and a vertical ratio of each raindrop training image 210 in the rainy scene image 200, where the horizontal ratio and the vertical ratio are values between 0 and 1.

In step S620, the raindrop-image-recognition model is used to recognize a plurality of raindrop images in a plurality of scene images of a video sequence, and the position and size of each raindrop image in the current scene image is recorded. For example, the image-capturing device 120 can be used to capture the video sequence, as shown in FIG. 4A. It is assumed that the image-capturing device 120 can shoot 5 scene images per second, such as scene images 401 to 405, and the scene images 401 to 405 will be input to the raindrop-image-recognition model 400 as the current scene image according to the shooting sequence.

In step S630, in response to a specific raindrop image in the current scene image among the scene images meeting a predetermined condition, the specific raindrop image is replaced by the image area corresponding to a specific scene image prior to the current scene image to generate an output scene image. For example, the raindrop-removal program 133 may first analyze the trajectory of each raindrop image in the current scene image, such as calculating the degree of overlapping between the raindrop image in the current scene image and the raindrop image 421 in any of previous scene images (e.g., scene images 401 to 404), wherein the degree of overlapping can be represented by "intersection over union (IoU)" which is a ratio of the overlapping area to the union area. The raindrop-removal program 133 can repeatedly execute the process of judging whether the raindrop image in the current scene image can be put into the revertible candidate list, and the raindrop-removal program can compare up to a predetermined number (e.g., 4) of previous scene images, but the invention is not limited thereto. The predetermined condition, for example, may be that the IoU of the specific raindrop image in the current scene image and the specific raindrop image in the specific scene image is less than a predetermined ratio threshold (e.g., 0.5).

In addition, the raindrop-removal program 133 may perform the raindrop-removal processing on each raindrop image in the current scene image according to the trajectory of each raindrop image to obtain an output scene image after the raindrop images are removed. For example, the raindrop-removal program 133 may replace the raindrop image in the current scene image with the pixels in the corresponding region of the raindrop image in the previous region to obtain the output scene image which the raindrop images are removed. The mechanism of the raindrop images in the revertible candidate list can be adjusted according to different conditions, such as selecting the raindrop images in the revertible candidate list of the current scene image in a predetermined order (e.g., sequential scanning) or randomly, or selecting the raindrop images in the revertible candidate list of the ROI of the current scene image in a predetermined order or randomly.

In view of the above, a computation apparatus and a method of removing raindrops from video images are provided. For example, using scene images taken at different time points in the video sequence, and a more suitable region in the previous scene image can be found and used to replace the raindrop image in the current scene image. Accordingly, the method of removing raindrops from video images can achieve a better raindrop-removal effect. When the raindrops in the scene images are moved, the accuracy and reliability of back-end image processing and autonomous-vehicle-driving decisions can be further improved.

The methods, or certain aspects or portions thereof, may take the form of program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of removing raindrops from video images, comprising:
    training a raindrop-image-recognition model using a plurality of raindrop training images labeled in a plurality of rainy scene images;
    recognizing a plurality of raindrop images in a plurality of scene images of a video sequence using the raindrop-image-recognition model;
    recording a position and size of each recognized raindrop image in the corresponding scene image; and
    calculating an intersection over union (IoU) of the specific raindrop image in the current scene image and the specific raindrop image in the specific scene image;
    in response to the IoU of a specific raindrop image in the current scene image and the specific raindrop image in the specific scene image being smaller than a predetermined ratio threshold, replacing the specific raindrop image in the current scene image with an image region corresponding to the specific raindrop image in a specific scene image prior to the current scene image to generate an output scene image; and
    when the IoUs of the specific raindrop image in the current scene image and the specific raindrop image in multiple previous scene images are smaller than the predetermined ratio threshold, selecting one previous scene image of the multiple previous scene images having the smallest IoU in a revertible candidate list or one previous scene image of the multiple previous scene images having a time point closest to the current scene image in a revertible candidate list.

2. The method as claimed in claim 1, wherein the specific raindrop image is selected from a region of interest (ROI) in the current scene image.

3. The method as claimed in claim 1, wherein there are a first number of raindrop images in the current scene image, and the method further comprises:
    in response to a number of raindrop images successfully replaced reaching a predetermined ratio of the first number, stopping replacing the remaining raindrop images in the current scene image.

4. A computation apparatus, comprising:
    a non-volatile memory, storing a raindrop-removal program; and
    a processor, configured to execute the raindrop-removal program to perform the following steps:
        training a raindrop-image-recognition model using a plurality of raindrop training images labeled in a plurality of rainy scene images;
        recognizing a plurality of raindrop images in a plurality of scene images of a video sequence using the raindrop-image-recognition model;
        recording a position and size of each recognized raindrop image in the corresponding scene image; and
        calculating an intersection over union (IoU) of the specific raindrop image in the current scene image and the specific raindrop image in the specific scene image;
        in response to the IoU of a specific raindrop image in the current scene image and the specific raindrop image in the specific scene image being smaller than a predetermined ratio threshold, replacing the specific raindrop image in the current scene image with an image region corresponding to the specific raindrop image in a specific scene image prior to the current scene image to generate an output scene image; and when the IOUs of the specific raindrop image in the current scene image and the specific raindrop image in multiple previous scene images are smaller than the predetermined ratio threshold, the processor selects one previous scene image of the multiple previous scene images having the smallest IoU in a revertible candidate list or one previous scene image of the multiple previous scene images having a time point closest to the current scene image in a revertible candidate list.

5. The computation apparatus as claimed in claim 4, wherein there are a first number of raindrop images in the current scene image, and in response to a number of raindrop images successfully replaced reaching a predetermined ratio of the first number, the processor stops replacing the remaining raindrop images in the current scene image.

* * * * *